United States Patent [19]

Horak

[11] Patent Number: 5,184,753
[45] Date of Patent: Feb. 9, 1993

[54] VOLUMETRIC COMPENSATION IN GRAVIMETRIC LIQUID MEASUREMENT

[76] Inventor: Vladimir Horak, 394 Taylor Ave., Hackensack, N.J. 07601

[21] Appl. No.: 764,149

[22] Filed: Sep. 20, 1991

[51] Int. Cl.$^5$ .............................................. B67B 7/00
[52] U.S. Cl. .......................................... 222/1; 222/54; 73/429; 364/557
[58] Field of Search ................ 222/21, 54, 64, 52, 222/68, 1; 364/557, 558; 73/426, 429

[56] References Cited

U.S. PATENT DOCUMENTS

| | | |
|---|---|---|
| 1,194,567 | 8/1916 | Stoltz . |
| 1,457,811 | 6/1923 | Baker . |
| 2,044,866 | 6/1936 | Williams et al. . |
| 2,063,892 | 12/1936 | Hazard . |
| 2,677,480 | 5/1954 | Wiczer . |
| 2,836,066 | 5/1958 | Brown . |
| 2,845,910 | 8/1958 | Pribble . |
| 2,933,073 | 4/1960 | Knudson . |
| 3,145,881 | 8/1964 | Moore et al. . |
| 3,703,246 | 11/1972 | Horak . |
| 3,827,610 | 8/1974 | Stiefel, Jr. .................... 73/429 X |
| 3,933,272 | 1/1976 | Lamb et al. . |
| 4,033,190 | 7/1977 | Hudspeth ............................ 73/426 |
| 4,216,753 | 8/1980 | Inoue et al. . |
| 4,217,871 | 8/1980 | Ohashi et al. . |
| 4,276,862 | 7/1981 | Matsumoto . |
| 4,315,491 | 2/1982 | Takeda . |
| 4,392,466 | 7/1983 | Mowbray et al. . |
| 4,445,627 | 5/1984 | Horak . |
| 4,546,746 | 10/1985 | Sato et al. . |
| 4,721,393 | 1/1988 | Kwast . |
| 4,726,337 | 2/1988 | Yoshida . |
| 4,726,343 | 2/1988 | Kruger . |
| 4,768,486 | 9/2988 | Koike et al. . |
| 4,779,581 | 10/1988 | Maier . |
| 4,821,921 | 4/1989 | Cartwright et al. . |
| 4,872,433 | 10/1989 | Paul et al. . |

Primary Examiner—Gregory L. Huson
Attorney, Agent, or Firm—Samuelson & Jacob

[57] ABSTRACT

An improvement in liquid measuring apparatus and method of the type in which a desired amount by weight of a liquid is measured by the placement of a corresponding volume of liquid in a liquid metering chamber compensates for changes in the density of the liquid resulting from variations in the temperature of the liquid in the metering chamber by selectively operating one or more of a plurality of separate incremental volume elements to establish changes in the volumetric capacity of the metering chamber in predetermined increments of volume corresponding to the predetermined volume of each of the selected separate incremental volume elements, the improvement further including selectively dispensing one or more fractions of the total amount of liquid in the liquid metering chamber to dispense the desired amount of liquid.

20 Claims, 3 Drawing Sheets

VOLUMETRIC COMPENSATION IN GRAVIMETRIC LIQUID MEASUREMENT

The present invention relates generally to the dispensing of measured amounts of liquid and pertains, more specifically, to improved apparatus and method for compensating for differences in the density of the liquid being dispensed resulting from variations in the temperature of the liquid.

A variety of systems are available currently for the dispensing of accurately measured quantities of liquid by gravimetric methods. In my earlier patent, U.S. Pat. No. 4,445,627, I have outlined the problem of compensating for changes in density due to variations in temperature in the liquid being dispensed by liquid metering systems in which liquid is dispensed volumetrically. The patent discloses a system which compensates for such changes by varying the volumetric capacity of a metering cavity by means of a liquid displacement member which is moved selectively into or out of the dispensing cavity in precise increments of displacement to decrease or increase the volumetric capacity in proportion to the density of the liquid being dispensed. In U.S. Pat. No. 2,836,066 there is disclosed a system for compensating for changes in density of a liquid being metered in a metering chamber by employing a variable volume piston and cylinder arrangement to change the volume of the metering chamber in proportion to the density of the liquid An important requirement for the satisfactory operation of the systems described in both of the above disclosures is the precise movement of a liquid displacement member, such as the elongate rod of U.S. Pat. No. 4,445,627, or the piston members of U.S. Pat. No. 2,836,066, to adjust the volumetric capacity of a metering cavity with accuracy. Further, the systems described in the above patents dispense only one predetermined compensated volume of liquid for each charge of the metering cavity or chamber.

The improvement of the present invention achieves accuracy in the adjustment of the volumetric capacity of a metering chamber, without the necessity for the precise movement of a liquid displacement member and the attendant relatively complex and more expensive actuating arrangements In addition, the present invention enables the selective dispensing of precisely measured fractions of the full charge of liquid in the metering chamber by the provision of volumetric compensation throughout the charge in the metering chamber As such, the present invention attains several objects and advantages, some of which are summarized as follows: Provides compensation for variations in the density of a liquid being metered in a metering cavity by changing the volumetric capacity of the metering cavity in proportion to the variations in density in a simplified manner; effects accurate changes in the volumetric capacity of a metering chamber to compensate for variations in the density of a liquid being metered by selected increments of volume, each selected increment of volume being predetermined and fixed so as to enable simplified operation of the compensating arrangement; enables the selective dispensing of accurately measured fractions of the volume of liquid in a metering chamber with volumetric compensation in every such fraction; provides a more practical, less expensive compensating system for the accurate metering of selected amounts of liquids subject to changes in density by virtue of variations in temperature; reduces the complexity and increases the reliability of liquid metering with liquid density compensation.

The above objects and advantages, as well as further objects and advantages, are attained by the present invention which may be described briefly as an improvement in a liquid metering apparatus in which a desired amount by weight of a liquid is measured by the placement of a corresponding volume of liquid in a metering chamber between a first location and a second location in the metering chamber, the liquid metering apparatus including compensating means for compensating for variations in the density of the liquid within the metering chamber resulting from variations in the temperature of the liquid within the metering chamber, within a range of temperatures, by varying the volumetric capacity of the metering chamber between the first location and the second location, the improvement comprising: volumetric capacity modifying means including a plurality of incremental volumetric elements for selective operation to establish changes in the volumetric capacity of the metering chamber by corresponding increments of volume, with each increment of volume extending from the first location to the second location; and actuating means for operating one or more of the incremental volumetric elements of the volumetric capacity modifying means to effect a change in the volumetric capacity of the metering chamber by increments of volume, with each increment of volume extending from the first location to the second location, in accordance with the temperature of the liquid placed within the metering chamber; whereby the volumetric capacity of the metering chamber between the first location and the second location is made to correspond to the volume of liquid in the desired amount by weight of the liquid at the temperature of the liquid within the metering chamber The invention further includes an improvement in the liquid metering method in which a desired amount by weight of a liquid is measured by the placement of a corresponding volume of liquid in a metering chamber between a first location and a second location in the metering chamber, the liquid metering method including compensating for variations in the density of the liquid within the metering chamber resulting from variations in the temperature of the liquid within the metering chamber, within a range of temperatures, by varying the volumetric capacity of the metering chamber between the first location and the second location, the improvement comprising: providing a plurality of incremental volumetric elements to establish changes in the volumetric capacity of the metering chamber by corresponding increments of volume, with each increment of volume extending from the first location to the second location; and operating one or more of the incremental volumetric elements to effect a change in the volumetric capacity of the metering chamber by increments of volume, with each increment of volume extending from the first location to the second location, in accordance with the temperature of the liquid placed within the metering chamber; whereby the volumetric capacity of the metering chamber between the first location and the second location is made to correspond to the volume of liquid in the desired amount by weight of the liquid at the temperature of the liquid within the metering chamber.

The invention will be understood more fully, while still further objects and advantages will become apparent, in the following detailed description of preferred embodiments of the invention illustrated in the accompanying drawing, in which.

Figure 1:
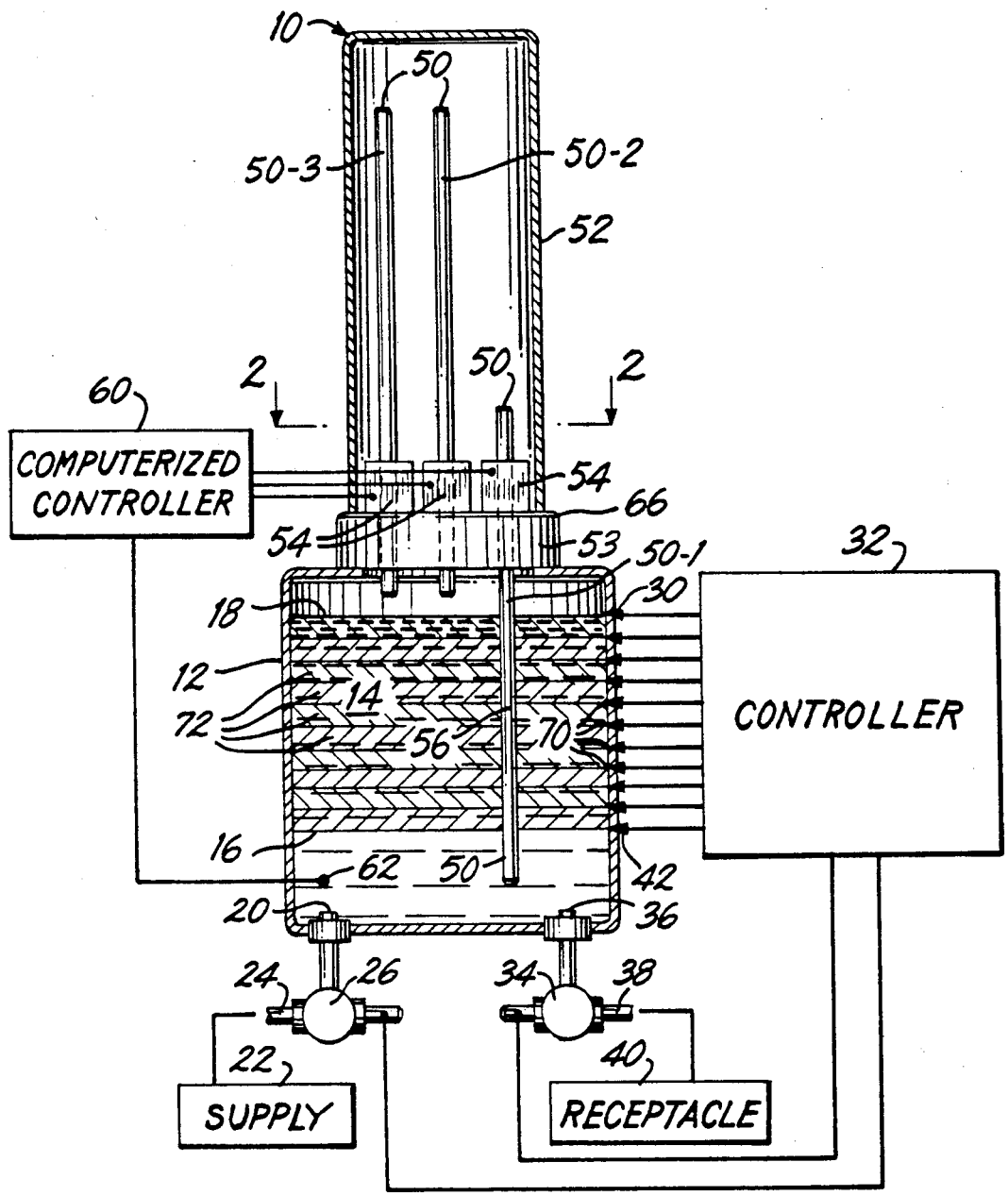
FIG. 1 is a schematic diagram of a liquid metering system illustrating apparatus and method of the present invention.
Figure 2:
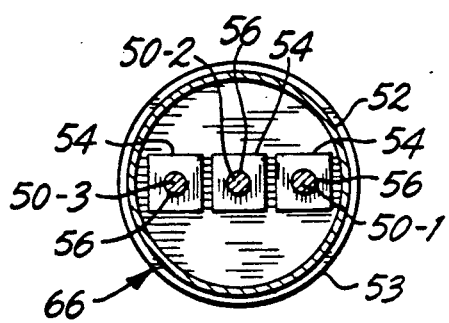
FIG. 2 is a schematic cross-sectional view taken along line 2—2 of FIG. 1.

Referring now to the drawing, and especially to FIGS. 1 and 2 thereof, a liquid metering apparatus constructed in accordance with the invention is illustrated schematically at 10 and is seen to include a metering chamber 12 within which a desired amount by weight of a liquid 14 is measured by placement of a corresponding volume of the liquid 14 between a first location, illustrated as a lower level 16, and a second location, illustrated as an upper level 18, in the metering chamber 12 An inlet port 20 communicates with a supply 22 of liquid 14 through a supply conduit 24 and an inlet valve 26 such that upon opening the inlet valve 26 liquid 14 will enter the metering chamber 12 and the level of the liquid 14 in the metering chamber 12 will rise. A liquid level sensor 30 is located at the upper level 18 and is connected to a controller 32 so that when the liquid 14 reaches the upper level 18 the sensor 30 will signal the controller 32 and the controller 32 will operate to close the inlet valve 26, thereby providing the desired amount of liquid 14 in the measured volume which extends from the lower level 16 to the upper level 18. Once the inlet valve 26 is closed, the controller 32 will operate to open an outlet valve 34 to deliver the measured volume through an outlet port 36 and an outlet conduit 38 to a receptacle 40. When the level of the liquid 14 drops to the lower level 16, another liquid level sensor 42 signals the controller 32 to close the outlet valve 34 so that only the measured volume of liquid 14 is delivered through the outlet port 36.

In order to compensate for differences in the density of liquid 14 resulting from variations in the temperature of the liquid 14 in the metering chamber 12, the volumetric capacity of the metering chamber 12 is varied, between the lower level 16 and the upper level 18 Thus, volumetric capacity modifying means is provided and includes a plurality of incremental volumetric elements shown in the form of elongate rods 50 housed in a rod casing 52 having a base 53 mounted atop the metering chamber 12. Actuating means in the form of actuators 54 are coupled with the rods 50 such that each rod 50 is moved selectively by a corresponding actuator 54 between an advanced position, wherein the rod 50 extends into the metering chamber 12 as illustrated by the advanced rod 50-1, and a retracted position, as illustrated by the retracted rods 50-2 and 50-3 Each rod 50 has a metering portion 56, and the length of the rod 50, and the metering portion 56 of the rod 50, is such that the metering portion 56 extends fully from the lower level 16 to the upper level 18 when the corresponding rod 50 is in the advanced position so that each rod 50 can serve as a liquid displacement member When a rod 50 is in the retracted position, the rod 50, and the metering portion 56 of the rod 50, is withdrawn fully from between the lower level 16 and the upper level 18 The metering portion 56 of each rod 50 provides an increment of volume of a known predetermined amount; hence, the placement of the rods 50 at either the advanced position or the retracted position will change the volumetric capacity of the metering chamber 12 between the lower level 16 and the upper level 18 by predetermined increments of volume, with each increment of volume extending from the lower level 16 to the upper level 18. Actuators 54 are operated selectively by a computerized controller 60 which responds to the temperature of the liquid 14 in the metering chamber 12, which temperature is sensed by a temperature sensor 62 connected to the controller 60, to advance or retract selected rods 50.

In the preferred arrangement and operation, all of the rods 50 normally are placed in the advanced position and the volumetric capacity of the metering chamber 12 between the lower level 16 and the upper level 18 is that which contains the desired amount of liquid 14 at the lowest temperature in the range of temperatures to be accommodated. Should the temperature of the liquid 14 rise, that rise in temperature will be detected by the temperature sensor 62 and transmitted to the controller 60 which, in turn, will select the number of rods 50 to be withdrawn to the retracted position and will operate the corresponding actuators 54 to withdraw the selected rods 50 to effect an increase in the volumetric capacity of the metering chamber 12 between the lower level 16 and the upper level 18 to provide compensation for the higher temperature and concomitant lower density in accordance with the temperature and density characteristics of the particular liquid 14.

Figure 3:
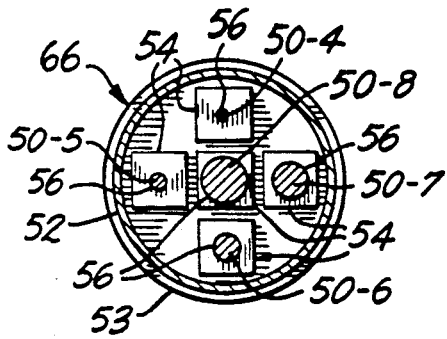
FIG. 3 is a schematic cross-sectional view similar to FIG. 2, but showing an alternate construction.

Since the rods 50 are moved only from one to the other of the fixed advanced position and the fixed retracted position, actuators 54 are relatively simple in construction. Thus, almost any motor which will move a corresponding rod 50 from one to the other of the two fixed end positions can be employed, and the necessity for accurate increments of movement is eliminated. In the preferred arrangement, the metering portion 56 of each rod 50 has a constant cross-sectional area along the length of the metering portion 56 and provides an easily manufactured accurately determined increment of volume. In the alternate embodiment illustrated in FIG. 3, the rods 50-4, 50-5, 50-6, 50-7 and 50-8 each have a metering portion 56 of a different diameter so that the predetermined increment of volume provided by each one of the rods 50 is different from the predetermined increment of volume provided by the other rods 50 and the range of compensation of the volumetric capacity is enlarged by the selective advancement and retraction of different combinations of the plurality of rods 50. The volumetric capacity modifying means of FIGS. 2 and 3 are interchangeable as units 66 merely by dismounting base 53 from metering chamber 12 to remove and replace one unit 66 with another.

The arrangement of the volumetric capacity modifying means enables the dispensing of accurately measured portions of the total amount of liquid 14 in the metering chamber 12, between the lower level 16 and the upper level 18. Thus, as seen in FIG. 1, a plurality of intermediate liquid level sensors 70 are arrayed along the axial length of the metering chamber 12, between the lower level 16 and the upper level 18, with the liquid level sensors 70 being spaced apart axially so as to define divisions in the volume between the lower level 16 and the upper level 18, the divisions being in the form of equal fractions 72. In the illustrated arrangement, the total volume in the metering chamber 12, between the lower level 16 and the upper level 18, is divided into ten equal fractions 72. Each sensor 70 is connected to the controller 32 so that the controller enables the selective dispensing of one or more of the fractions 72 by selecting one of the sensors 70 to which the controller 32 will respond to close the outlet valve 34 when the liquid level drops from the upper level 18 to the level of that selected sensor 70. Since the metering portion 56 of every advanced rod 50 has a constant cross-sectional area along the full length of the metering portion 56 and extends fully through every fraction 72, appropriate volumetric compensation is achieved in every fraction 72 and each dispensed fraction 72 is measured accurately, regardless of the total number of fractions 72. Apparatus 10 thus is capable of dispensing selectively either the full charge of liquid 14 between the lower level 16 and the upper level 18, or one or more of the fractions 72, all compensated for any changes in density.

Figure 4:
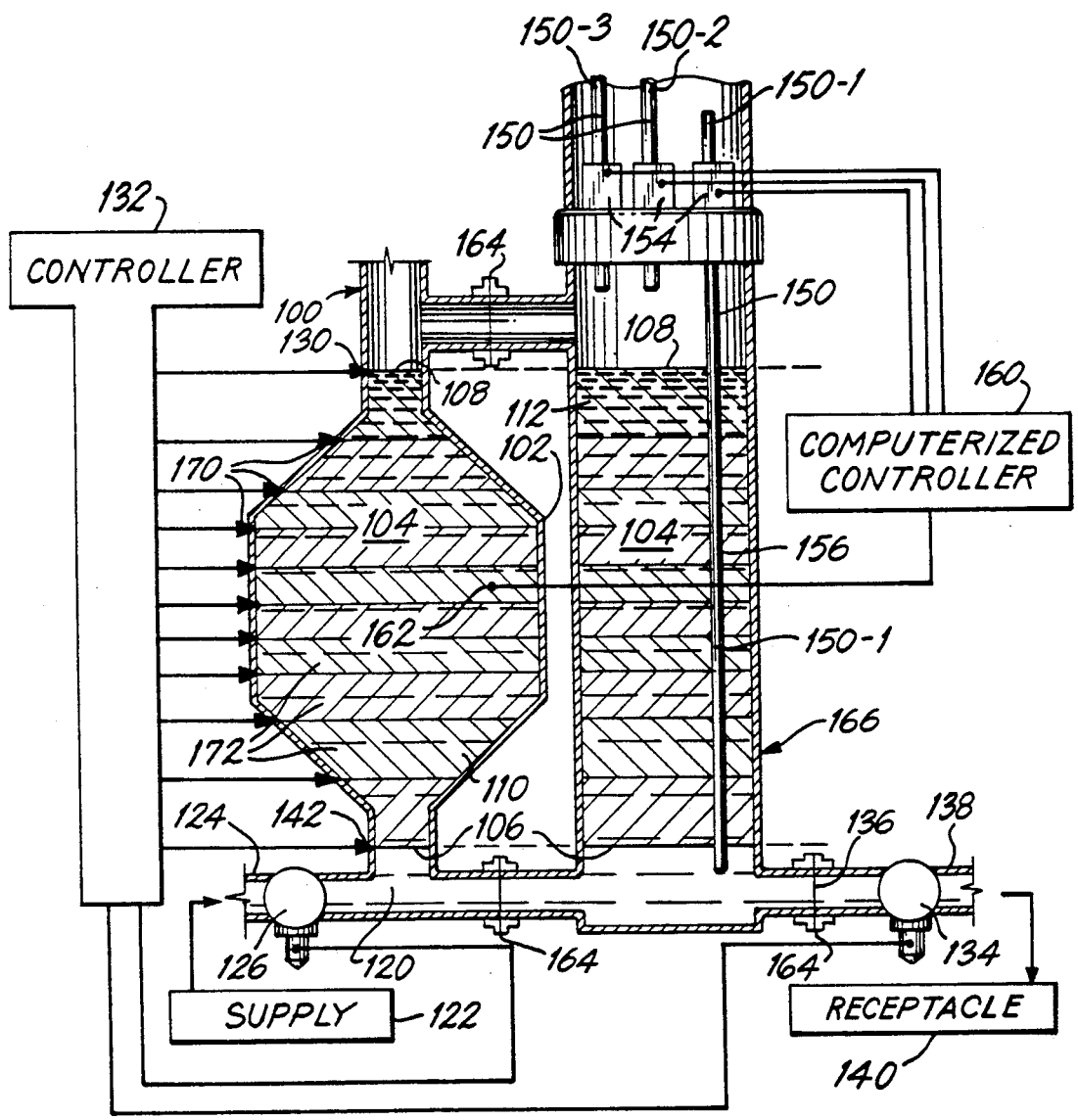
FIG. 4 is a schematic diagram of an alternate liquid metering system showing another embodiment of the invention.

Turning now to FIG. 4, another liquid metering apparatus constructed in accordance with the invention is illustrated schematically at 100 and is seen to include a metering chamber 102 within which a desired amount by weight of a liquid 104 is measured by placement of a corresponding volume of the liquid 104 between a first location, illustrated as a lower level 106, and a second location, illustrated as an upper level 108, in the metering chamber 102. In this instance, however, the metering chamber 102 includes a primary chamber 110 and a secondary chamber 112 located outside of the primary chamber 110 and communicating with the primary chamber 110 so that the volumetric capacity of the metering chamber 102 is the total of the volume of the primary chamber 110 and the secondary chamber 112. An inlet port 120 communicates with a supply 122 of liquid 104 through a supply conduit 124 and an inlet valve 126 such that upon opening the inlet valve 126, liquid 104 will enter the metering chamber 102 and the level of the liquid 104 in the metering chamber 102 will rise. A liquid level sensor 130 is located at the upper level 108 and is connected to a controller 132 so that when the liquid 104 reaches the upper level 108 the sensor 130 will signal the controller 132 and the controller 132 will operate to close the inlet valve 126, thereby providing the desired amount of liquid 104 in the measured volume which extends from the lower level 106 to the upper level 108 in both the primary chamber 110 and the secondary chamber 112. Once the inlet valve 126 is closed, the controller 132 will operate to open an outlet valve 134 to deliver the measured volume through an outlet port 136 and an outlet conduit 138 to a receptacle 140. When the level of the liquid 104 drops to the lower level 106, another liquid level sensor 142 signals the controller 132 to close the outlet valve 132 so that only the measured volume of liquid 104 is delivered through the outlet port 138. The accuracy of the measured volume is enhanced by the placement of each of the liquid level sensors 130 and 142 in a corresponding much-reduced cross-sectional area of the primary chamber 110 of the metering chamber 102, as explained in my U.S. Pat. No. 4,880,039.

In order to compensate for differences in the density of liquid 104 resulting from variations in the temperature of the liquid 104 in the metering chamber 102, the volumetric capacity of the metering chamber 102 is varied, between the lower level 106 and the upper level 108. Thus, volumetric capacity modifying means is provided and includes a plurality of incremental volumetric elements shown in the form of elongate rods 150 housed in a rod casing 152. In the present embodiment, the rod casing 152 is mounted atop the secondary chamber 112 of metering chamber 102. Actuating means in the form of actuators 154 are coupled with corresponding rods 150 such that each rod 150 is moved selectively between an advanced position, wherein the rod 150 extends into the secondary chamber 112 of the metering chamber 102 as illustrated by the advanced rod 150-1, and a retracted position, as illustrated by the retracted rods 150-2 and 150-3. Each rod 150 has a metering portion 156, and the length of the rod 150, and the metering portion 156 of the rod 150, is such that the metering portion 156 extends fully from the lower level 106 to the upper level 108 when the corresponding rod 150 is in the advanced position so that each rod 150 can serve as a liquid displacement member. When a rod 150 is in the retracted position, the rod 150, and the metering portion 156 of the rod 150, is withdrawn fully from between the lower level 106 and the upper level 108. The metering portion 156 of each rod 150 provides an increment of volume of a predetermined known amount; hence, the placement of the rods 150 at either the advanced position or the retracted position will change the volumetric capacity of the metering chamber 102 between the lower level 106 and the upper level 108 by predetermined increments of volume, with each increment of volume extending from the lower level 106 to the upper level 108. Actuators 154 are operated selectively by a computerized controller 160 which responds to the temperature of the liquid 104 in the metering chamber 102, which temperature is sensed by a temperature sensor 162, to advance or retract corresponding selected rods 150.

The secondary chamber 112 is coupled with the primary chamber 110 and with the outlet port 136 at couplings 164 which are detached readily so as to enable the secondary chamber 112 with the volumetric capacity modifying means to be constructed in one interchangeable unit 166. In this manner, the liquid metering apparatus 100 is adapted readily to accommodate a wider range of liquids over a wider range of temperatures.

The arrangement of the volumetric capacity modifying means enables the dispensing of accurately measured portions of the total amount of liquid 104 in the metering chamber 102, between the lower level 106 and the upper level 108. Thus, as seen in FIG. 4, a plurality of intermediate liquid level sensors 170 are arrayed along the axial length of the metering chamber 102, between the lower level 106 and the upper level 108, with the liquid level sensors 170 being spaced apart axially so as to define divisions in the volume between the lower level 106 and the upper level 108 in the form of equal fractions 172. It is noted that since the lateral cross-sectional area of the metering chamber 102 between the lower level 106 and the upper level 108 varies along the axial length of the metering chamber 102, the spacing between the sensors 170 is varied in proportion so as to maintain the fractions 172 equal in volume. In the illustrated arrangement, the total volume in the metering chamber 102, between the lower level 106 and the upper level 108, is divided into ten equal fractions 172. Each sensor 170 is connected to the controller 132 so that the controller 132 enables the selective dispensing of one or more of the fractions 172 by selecting one of the sensors 170 to which the controller 132 will respond to close the outlet valve 134 when the liquid level drops from the upper level 108 to the level of that selected sensor 170. Since the metering portion 156 of every advanced rod 150 has a constant cross-sectional area along the full length of the metering portion 156 and extends fully through every fraction 172, appropriate volumetric compensation is achieved in every fraction 172 and each dispensed fraction 172 is measured accurately, regardless of the total number of fractions 172. Apparatus 100 thus is capable of dispensing selectively either the full charge of liquid 104 between the lower level 106 and the upper level 108, or one or more of the fractions 172, all compensated for any changes in density.

Figure 5:
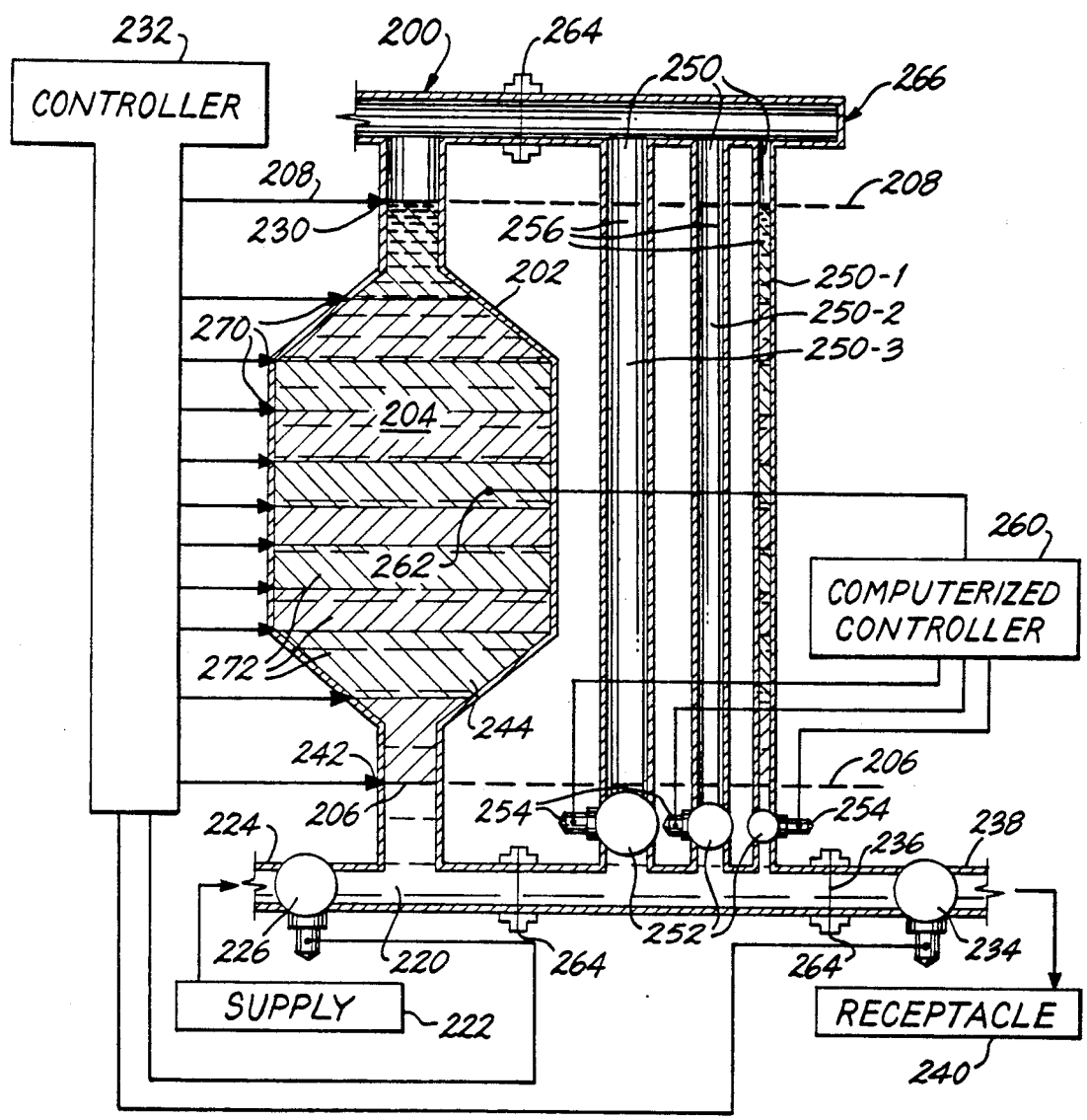
FIG. 5 is a schematic diagram of another alternate liquid metering system illustrating still another embodiment of the invention.

Referring now to FIG. 5, still another embodiment of the invention is illustrated in the form of liquid metering apparatus 200. Liquid metering apparatus 200 is seen to include a metering chamber 202 within which a desired amount by weight of a liquid 204 is measured by placement of a corresponding volume of the liquid 204 between a first location, illustrated as a lower level 206, and a second location, illustrated as an upper level 208, in the metering chamber 202. An inlet port 220 communicates with a supply 222 of liquid 204 through a supply conduit 224 and an inlet valve 226 such that upon opening the inlet valve 226 liquid 204 will enter the metering chamber 202 and the level of the liquid 204 in the metering chamber 202 will rise. A liquid level sensor 230 is located at the upper level 208 and is connected to a controller 232 so that when the liquid 204 reaches the upper level 208 the sensor 230 will signal the controller 232 and the controller 232 will operate to close the inlet valve 226, thereby providing the desired amount of liquid 204 in the measured volume which extends from the lower level 206 to the upper level 208. Once the inlet valve 226 is closed, the controller 232 will operate to open an outlet valve 234 to deliver the measured volume through an outlet port 236 and an outlet conduit 238 to a receptacle 240. When the level of the liquid 204 drops to the lower level 206, another liquid level sensor 242 signals the controller 232 to close the outlet valve 234 so that only the measured volume of liquid 204 is delivered through the outlet port 236. The accuracy of the measured volume is enhanced by the placement of each of the liquid level sensors 230 and 242 in a corresponding much-reduced cross-sectional area of a main chamber 244 of the metering chamber 202, as explained in my U.S. Pat. No. 4,880,039.

In order to compensate for differences in the density of liquid 204 resulting from variations in the temperature of the liquid 204 in the metering chamber 202, the volumetric capacity of the metering chamber 202 is varied, between the lower level 206 and the upper level 208. Thus, volumetric capacity modifying means is provided and includes a plurality of incremental volumetric elements shown in the form of sub-chambers 250 each communicating with the balance of metering chamber 202, in the form of a main chamber 244 of metering chamber 202, through valving means including a valve 252. Actuating means is provided in the form of an actuator 254 coupled with each valve 252 such that each valve 252 is actuated selectively between an open position, wherein the corresponding sub-chamber 250 communicates with the main chamber 244 of the metering chamber 202 as illustrated at the sub-chamber 250-1, and a closed position wherein the corresponding sub-chamber 250 is out of communication with the main chamber 244 of the metering chamber 202, as illustrated by the sub-chambers 250-2 and 250-3. Each sub-chamber 250 has a metering portion 256, and the length of the sub-chamber 250, and the metering portion 256 of the sub-chamber 250, is such that the metering portion 256 extends fully from the lower level 206 to the upper level 208 when the corresponding sub-chamber 250 is in communication with the main chamber 244 of the metering chamber 202 so that each sub-chamber 250 can serve as a liquid containment member. The metering portion 256 of each sub-chamber 250 provides an increment of volume of a predetermined known amount; hence, the placement of the sub-chambers 250 either into communication with the main chamber 244 of the metering chamber 202 or out of communication with the main chamber 244 of the metering chamber 202 will change the volumetric capacity of the metering chamber 202 between the lower level 206 and the upper level 208 by predetermined increments of volume, with each increment of volume extending from the lower level 206 to the upper level 208. .Actuators 254 are operated selectively by a computerized controller 260 which responds to the temperature of the liquid 204 in the metering chamber 202, which temperature is sensed by a temperature sensor 262, to open or close selected valves 252.

In the preferred arrangement and operation, all of the valves 252 normally are closed and the volumetric capacity of the metering chamber 202 between the lower level 206 and the upper level 208 is that which contains the desired amount of liquid 204 at the lowest temperature in the range of temperatures to be accommodated. Should the temperature of the liquid 204 rise, that rise in temperature will be detected by the temperature sensor 262 and transmitted to the controller 260 which, in turn, will select the number of valves 252 to be opened and will operate the appropriate actuators 254 to open communication between the selected sub-chambers 250 and the main chamber 244 of the metering chamber 202 to effect an increase in the volumetric capacity of the metering chamber 202 between the lower level 206 and the upper level 208 to provide compensation for the higher temperature and concomitant lower density in accordance with the temperature and density characteristics of the particular liquid 204.

Since the valves 252 are operated only from one to the other of the open and closed positions, actuators 254 are relatively simple in construction. Thus, almost any motor which will operate each valve 252 from one to the other of the two fixed end positions can be employed, and the necessity for accurate increments of movement is eliminated. In the preferred arrangement, the metering portion 256 of each sub-chamber 250 has a constant cross-sectional area along the length of the metering portion 256 and provides an easily manufactured accurately determined increment of volume. The actual cross-sectional area of each metering portion 256 preferably is made to differ from sub-chamber to sub-chamber so that the range of compensation of the volumetric capacity is enlarged by the opening and closing of different combinations of the plurality of valves 254.

The sub-chambers 250 are coupled with the main chamber 244 of the metering chamber 202 at couplings 264 which are detached readily so as to enable the volumetric capacity modifying means to be constructed in one interchangeable unit 266. In this manner, the liquid metering apparatus 200 is adapted readily to accommodate a wider range of liquids over a wider range of temperatures.

The arrangement of the volumetric capacity modifying means enables the dispensing of accurately measured portions of the total amount of liquid 204 in the metering chamber 202, between the lower level 206 and the upper level 208. Thus, as seen in FIG. 5, a plurality of intermediate liquid level sensors 270 are arrayed along the axial length of the metering chamber 202, between the lower level 206 and the upper level 208, with the liquid level sensors 270 being spaced apart axially so as to define divisions in the volume between the lower level 206 and the upper level 208 in the form of equal fractions 272. It is noted that since the lateral cross-sectional area of the metering chamber 202 between the lower level 206 and the upper level 208 varies along the axial length of the metering chamber 202, the spacing between the sensors 270 is varied in proportion so as to maintain the fractions 272 equal in volume. In the illustrated arrangement, the total volume in the metering chamber 202, between the lower level 206 and the upper level 208, is divided into ten equal fractions 272. Each sensor 270 is connected to the controller 232 so that the controller 232 enables the selective dispensing of one or more of the fractions 272 by selecting one of the sensors 270 to which the controller 232 will respond to close the outlet valve 234 when the liquid level drops from the upper level 208 to the level of that selected sensor 270. Since the metering portion 256 of every sub-chamber 250 which communicates with the main chamber 244 has a constant cross-sectional area along the full length of the metering portion 256 and extends fully through every fraction 272, appropriate volumetric compensation is achieved in every fraction 272 and each dispensed fraction 272 is measured accurately, regardless of the total number of fractions 272. Apparatus 200 thus is capable of dispensing selectively either the full charge of liquid 204 between the lower level 206 and the upper level 208, or one or more of the fractions 272, all compensated for any changes in density.

It will be seen that the present invention attains the several objects and advantages summarized above, namely: Provides compensation for variations in the density of a liquid being metered in a metering cavity by changing the volumetric capacity of the metering cavity in proportion to the variations in density in a simplified manner; effects accurate changes in the volumetric capacity of a metering chamber to compensate for variations in the density of a liquid being metered by selected increments of volume, each selected increment of volume being predetermined and fixed so as to enable simplified operation of the compensating arrangement; enables the selective dispensing of accurately measured fractions of the volume of liquid in a metering chamber with volumetric compensation in every such fraction; provides a more practical, less expensive compensating system for the accurate metering of selected amounts of liquids subject to changes in density by virtue of variations in temperature; reduces the complexity and increases the reliability of liquid metering with liquid density compensation.

It is to be understood that the above description of embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows:

1. An improvement in a liquid metering apparatus in which a desired amount by weight of a liquid is measured by the placement of a corresponding volume of liquid in a metering chamber between a first location and a second location in the metering chamber, the liquid metering apparatus including compensating means for compensating for variations in the density of the liquid within the metering camber resulting from variations in the temperature of the liquid within the metering chamber, within a range of temperatures, by varying the volumetric capacity of the metering chamber between the first location and the second location, the improvement comprising:

volumetric capacity modifying means including a plurality of incremental volumetric elements of predetermined volume arranged for selective operation to establish changes in the volumetric capacity of the metering chamber by corresponding increments of volume, each one of which increments of volume extends from the first location to the second location and corresponds to the predetermined volume of each respective one of the incremental volumetric elements; and actuating means for selectively operating one or more of the incremental volumetric elements of the volumetric capacity modifying means to effect a change in the volumetric capacity of the metering chamber by one or more increments of volume, each one of the increments of volume extending from the first location to the second location and corresponding to the predetermined volume of each respective one of the volumetric elements selectively operated by the actuating means, in accordance with the temperature of the liquid placed within the metering chamber;

whereby the volumetric capacity of the metering chamber between the first location and the second location is made to correspond to the volume of liquid in the desired amount by weight of the liquid at the temperature of the liquid within the metering chamber.

2. The improvement of claim 1 wherein:

the incremental volumetric elements comprise elongate liquid displacement members, each liquid displacement member having a metering portion of predetermined volume and being selectively movable within the metering chamber between a first position wherein the metering portion of the liquid displacement member extends fully from the first location to the second location and a second position wherein the metering portion of the liquid displacement member is withdrawn fully from between the first location and the second location; and the actuating means is coupled with the liquid displacement members such that selected liquid displacement members are positioned by the actuating means at respective first positions and second positions in accordance with the change in the volumetric capacity of the metering chamber required between the first location and the second location to compensate for the temperature of the liquid in the metering chamber.

3. The improvement of claim 2 wherein each liquid displacement member comprises a rod having a constant cross-sectional area along the length of the metering portion of the liquid displacement member.

4. The improvement of claim 3 including sensing means for defining fractions in the liquid in the metering chamber between the first location and the second location, and dispensing means for selectively dispensing said liquid in one or more of said fractions.

5. The improvement of claim 2 wherein each liquid displacement member comprises a rod having a predetermined volume along the length of the metering portion of the liquid displacement member, and said predetermined volume of at least one rod is different from said predetermined volume of at least another rod.

6. The improvement of claim 5 wherein each rod has a constant cross-sectional area along the length of the metering portion of the liquid displacement member.

7. The improvement of claim 6 including sensing means for defining fractions in the liquid in the metering chamber between the first location and the second location, and dispensing means for selectively dispensing said liquid in one or more of said fractions.

8. The improvement of claim 2 wherein the metering chamber includes a primary chamber and a secondary chamber outside the primary chamber, and the elongate liquid displacement members each include a rod extending within the secondary chamber.

9. The improvement of claim 1 wherein:
the incremental volumetric elements comprise elongate liquid containment members within the metering chamber, each liquid containment member having a metering portion of predetermined volume extending fully from the first location to the second location; and
the actuating means includes valving means coupled with the liquid containment members such that the metering portions of selected liquid containment members are brought into communication and out of communication with the metering chamber in accordance with the change in the volumetric capacity of the metering chamber required between the first location and the second location to compensate for the temperature of the liquid in the metering chamber.

10. The improvement of claim 9 wherein each liquid containment member comprises a sub-chamber having a constant cross-sectional area along the length of the metering portion of the sub-chamber.

11. The improvement of claim 9 wherein each liquid containment member includes a sub-chamber having a predetermined volume along the length of the metering portion of the liquid containment member, and said predetermined volume of at least one sub-chamber is different from said predetermined volume of at least another sub-chamber.

12. The improvement of claim 11 wherein each sub-chamber has a constant-cross sectional area along the length of the metering portion of the sub-chamber.

13. The improvement of claim 9 wherein the metering chamber includes a main chamber and the elongate liquid containment members each include a sub-chamber located outside the main chamber.

14. The improvement of claim 1 wherein the metering chamber is oriented such that the first location is a lower level and the second location is an upper level.

15. The improvement of claim 1 including sensing means for defining fractions in the liquid in the metering chamber between the first location and the second location, and dispensing means for selectively dispensing said liquid in one or more of said fractions.

16. An improvement in the liquid metering method in which a desired amount by weight of a liquid is measured by the placement of a corresponding volume of liquid in a metering chamber between a first location and a second location in the metering chamber, the liquid metering method including compensating for variations in the density of the liquid within the metering chamber resulting from variations in the temperature of the liquid within the metering chamber, within a range of temperatures, by varying the volumetric capacity of the metering chamber between the first location and the second location, the improvement comprising:
providing a plurality of incremental volumetric elements of predetermined volume arranged to establish changes in the volumetric capacity of the metering chamber by corresponding increments of volume, each one of which increments of volume extends from the first location to the second location and corresponds to the predetermined volume of each respective one of the incremental volumetric elements; and
selectively operating one or more of the incremental volumetric elements to effect a change in the volumetric capacity of the metering chamber by one or more increments of volume, each one of the increments of volume extending from the first location to the second location and corresponding to the predetermined volume of each respective one of the selectively operated volumetric elements, in accordance with the temperature of the liquid placed within the metering chamber;
whereby the volumetric capacity of the metering chamber between the first location and the second location is made to correspond to the volume of liquid in the desired amount by weight of the liquid at the temperature of the liquid within the metering chamber.

17. The improvement of claim 16 wherein the incremental volumetric elements comprise liquid displacement members, each liquid displacement member having a metering portion, and the method includes advancing the metering portions of all of the liquid displacement members fully from the first location to the second location to establish a minimum volumetric capacity in the metering chamber, and withdrawing the metering portion of one or more selected liquid displacement members fully from between the first location and the second location to increase the volumetric capacity of the metering chamber, in increments corresponding to each withdrawn metering portion, to the volume of liquid in the desired amount.

18. The improvement of claim 16 wherein the incremental volumetric elements comprise liquid containment members, each of the liquid containment members having a metering portion extending fully from the first location to the second location, and the method includes closing communication between the metering portions of all of the liquid containment members and the balance of the metering chamber to establish a minimum volumetric capacity in the metering chamber and then opening communication between the metering portions of one or more selected liquid containment members and the balance of the metering chamber fully from the first location to the second location to increase the volumetric capacity of the metering chamber, in increments corresponding to each opened metering portion, to the volume of liquid in the desired amount.

19. The improvement of claim 16 including orienting the metering chamber such that the first location is a lower level and the second location is an upper level.

20. The improvement of claim 16 including defining fractions in the liquid in the metering chamber between the first location and the second location, and selectively dispensing said liquid in one or more of said fractions.

* * * * *